United States Patent Office 3,444,212
Patented May 13, 1969

3,444,212
3-AROYL-2-ALKYLCHROMONE COMPOUNDS
Kenneth Robert Huffman and Edwin Fisher Ullman, Stamford, Conn., assignors to American Cyanamid Company, Stamford, Conn., a corporation of Maine
No Drawing. Filed Oct. 24, 1966, Ser. No. 588,745
Int. Cl. C07d 7/24, 7/34
U.S. Cl. 260—345.2         6 Claims

ABSTRACT OF THE DISCLOSURE

Photochromic 3-aroyl-2-alkylchromones of the formula

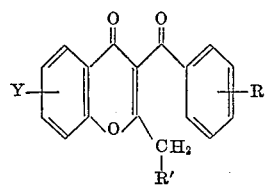

wherein R' is alkyl, R is hydrogen, alkyl, hydroxy, alkoxy, alkylthio, cyano, nitro, amino, halogen or trifluoromethyl and Y is the same as R or phenyl, alkylphenyl or acyloxy, these compounds being useful in sunglasses, windows and the like, are prepared by condensing an appropriately substituted ortho-hydroxy dibenzoylmethane with an acid anhydride in the presence of a mildly basic catalyst.

---

This invention relates to photochromic 3-aroyl-2-alkylchromone compounds of the formula

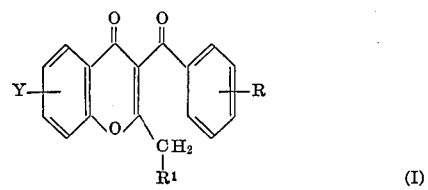

wherein Y is hydrogen, alkyl, phenyl, alkyl-substituted phenyl, hydroxy, alkoxy, alkylthio, acyloxy, cyano, nitro, amino, halogen, or trifluoromethyl; R is hydrogen, alkyl, hydroxy, alkoxy, alkylthio, cyano, nitro, amino, halogen, or trifluoromethyl; and $R^1$ is alkyl.

Alkyl in alkyl, alkoxy, alkylthio, and alkyl-substituted phenyl of Formula I above may contain from one to about eighteen carbon atoms inclusive, but preferably is lower alkyl ($C_1$–$C_8$). Acyloxy includes

wherein $R^2$ is aliphatic (e.g., $C_1$–$C_8$), aromatic (e.g., phenyl or naphthyl) or hydrogen. Amino includes —$NH_2$, monoalkylamino or dialkylamino wherein alkyl is preferably lower alkyl ($C_1$–$C_8$). Halogen includes chloro, bromo, iodo and fluoro. From the definition of Y, R and $R^1$ it will be noted that the substituents may each be different or, in some cases, two or all three may be the same. The foregoing description is but typical of the many substituents effective as Y, R, $R^1$ and $R^2$, it being understood that other substituents which do not inhibit the photochromic character of the compound will also be suitable.

These compounds are prepared conveniently and in a known manner by condensation of an appropriately substituted o-hydroxydibenzoylmethane with an acid anhydride in the presence of a mildly basic catalyst. Typical bases are trialkyl amines such as triethylamine and tributylamine. Reaction temperature is in the range 50° C. to 200° C. and reaction time is generally inversely proportional thereto, varying from several minutes to several hours.

U.S. Patent No. 3,331,859 issued on July 18, 1967, to Kenneth Robert Huffman and Edwin Fisher Ullman, discloses photochromic 3-aroyl-(2-aryl-methyl)chromones. The latter compounds differ from the present compounds in that a phenyl or substituted phenyl group replaces the alkyl group defined by $R^1$ of Formula I above.

On the basis of said patent and the detailed discussion in J. Am. Chem. Soc., 87, 5417 (1965) it is not predictable that the compounds of the present invention are photochromic. Thus, it was expected from earlier work (page 5421 of the J. Am. Chem. Soc. article) that compounds in which the conjugation of the basic chromone structure was extended (such as those of said copending application) would be photochromic whereas compounds in which the conjugation was not extended would not be photochromic. For example, 3-benzoyl-2-methylchromone [a compound of Formula I above except that $R^1$ is hydrogen] is not photochromic. The compounds of the present invention, although they likewise do not extend the conjugation, are nevertheless photochromic.

The compounds of the invention exhibit photochromism, usually by ultraviolet irradiation, and are therefore useful in the manufacture of articles such as sunglasses, novelty toys, jewelry, and variable light transmission devices such as windows, photocopying machines and materials, optical masks, and the like.

Photochromic films, moldings or coatings, containing compounds of the invention in solution or as dispersed solids are particularly useful embodiments. Typical films are prepared by dissolving the compound in a suitable solvent such as benzene and adding this solution to a thermoplastic polymer solution. A representative composition is a 20% by weight solids mixture containing polymethylmethacrylate and photochromic compound (95% polymer to 5% photochromic compound). The composition is then spread on a suitable substrate such as polyester film and the solvent evaporated. The resulting article is useful as an optical mask, memory tape or sunvisor.

Compounds of the invention are also useful as intermediates in the preparation of other photochromic compounds as illustrated in the following equation:

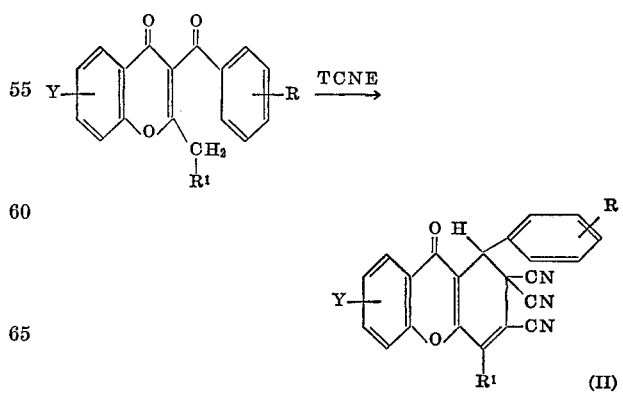

TCNE in the above equation is tetracyanoethylene. Compounds of Formula II are disclosed in copending application Ser. No. 588,702, filed simultaneously herewith. This application was abandoned after a continuation-in-part application, Ser. No. 717,412, was filed on Mar. 29, 1968.

The following examples further illustrate the invention but are not limitative thereof except as indicated in the appended claims. All parts and percentages are by weight unless otherwise specified.

Example 1.—3-benzoyl-2-ethylchromone

A mixture of 1.7 grams of o-hydroxydibenzoylmethane, 1.8 grams of propionic anhydride and 0.80 gram triethylamine was heated on a steam bath for 1.5 hours. The cooled reaction mixture was then taken up in ethanol, diluted with a large volume of water, and the resulting mixture stirred until crystallization was complete. The yield of crude product was 1.55 grams (79%), melting point 80–83° C. Two recrystallizations from hexane raised the melting point to 86–88° C.

Analysis.—Calc'd for $C_{18}H_{14}O_3$: C, 77.68; H, 5.07. Found: C, 77.70; H, 5.16.

Example 2.—3-benzoyl-5-benzoyloxy-2-ethylchromone

A mixture of 2.0 grams of 2-benzoyloxy-6-hydroxydibenzoylmethane, 1.45 grams of pripionic anhydride, and 0.60 gram of triethyamine was heated on a steam bath for 1.5 hours. Addition of ether to the cooled reaction gave a solid which was recrystallized from benzene-petroleum ether affording 1.0 gram (45%) of the chromone, melting point 185–191° C. One further recrystallization gave colorless crystals, melting point 188–192° C.

Analysis.—Calc'd for $C_{25}H_{18}O_5$: C, 75.37; H, 4.55. Found: C, 75.16; H, 4.80.

Example 3.—2-ethyl-3-(p-methoxybenzoyl)chromone

A mixture of 10.0 grams of o-hydroxy-p'-methoxydibenzoylmethane, 9.6 grams of propionic anhydride, and 4.5 grams of triethylamine was heated in a steam bath for 1.5 hours. The cooled oil was treated with water and stirred until crystallization was complete. Recrystallization from hexane gave 7.3 grams (64%) of colorless crystals, melting point 98–100.5° C.

Analysis.—Calc'd for $C_{19}H_{16}O_4$: C, 74.01; H, 5.23. Found: C, 73.70; H, 5.25.

Examples 4–22

Table I below illustrates other compounds of the invention which are prepared substantially as described in Examples 1–3.

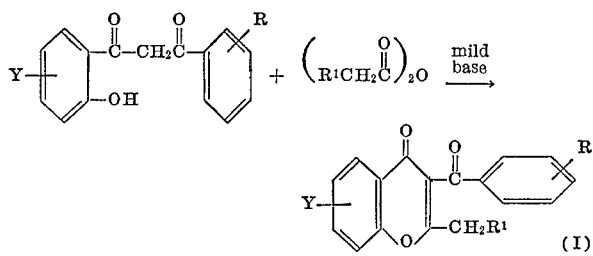

| Ex. | Y | R | R' |
|---|---|---|---|
| 4 | 3'-ethyl | Hydrogen | Methyl. |
| 5 | 4'-phenyl | p-Hydroxy | n-Butyl. |
| 6 | 4'-(p-tolyl) | m-Methyl | Methyl. |
| 7 | Hydrogen | o-Methoxy | n-Octyl. |
| 8 | 4'-hydroxy | p-Methylthio | Methyl. |
| 9 | 5'-ethoxy | Hydrogen | n-Propyl. |
| 10 | 5'-acetoxy | p-Cyano | Ethyl. |
| 11 | 4'-methylthio | o-Chloro | Methyl. |
| 12 | Hydrogen | p-Dimethylamino | sec.-butyl. |
| 13 | 3'-bromo | Hydrogen | i-Propyl. |
| 14 | 4'-chloro | p-Trifluoromethyl | Ethyl. |
| 15 | 4'-dimethylamino | m-Bromo | Methyl. |
| 16 | 4'-trifluoromethyl | p-(n-Butyl) | Do. |
| 17 | 4'-cyano | Hydrogen | n-Undecyl. |
| 18 | 6'-methoxy | p-Ethoxy | Methyl. |
| 19 | 4'-nitro | p-Fluoro | Do. |
| 20 | 4'-diethylamino | m-Nitro | Do. |
| 21 | Hydrogen | p-Cyano | Do. |
| 22 | 4'-dimethylamino | Hydrogen | Do. |

We claim:
1. A photochromic 3-aroyl-2-alkyl-chromone of the formula

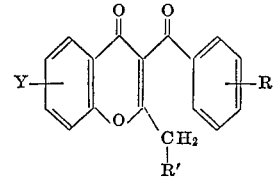

wherein Y is hydrogen, alkyl of 1 to 18 carbon atoms, phenyl, alkyl-substituted phenyl containing 1 to 8 alkyl carbon atoms, hydroxy, alkoxy of 1 to 18 carbon atoms, alkylthio of 1 to 18 carbon atoms, acetoxy, cyano, nitro, amino, halogen, or trifluoromethyl; R is hydrogen, alkyl of 1 to 18 carbon atoms, hydroxy, alkoxy of 1 to 18 carbon atoms, alkylthio of 1 to 18 carbon atoms, cyano, nitro, amino, halogen, or trifluoromethyl; and R' is alkyl of 1 to 18 carbon atoms.
2. The chromone of claim 1 wherein Y and R are hydrogen and $R^1$ is methyl.
3. The chromone of claim 1 wherein Y is 5-benzoyloxy, R is hydrogen, and $R^1$ is methyl.
4. The chromone of claim 1 wherein Y is hydrogen, R is p-methoxy, and $R^1$ is methyl.
5. The chromone of claim 1 wherein Y is hydrogen, R is p-cyano, and $R^1$ is methyl.
6. The chromone of claim 1 wherein Y is 4'-dimethylamino, R is hydrogen, and $R^1$ is methyl.

References Cited

UNITED STATES PATENTS 3,331,859   7/1967   Huffman et al. _____ 260—345.2

OTHER REFERENCES

Henderson, Jr., et al.: J. Amer. Chem. Soc., vol 87, pp. 5424–8 (1965), QD 1.A5.

Baker et al.: J. Chem. Soc. (1952), pp. 1294–302, QD 1.C6.

HENRY R. JILES, Primary Examiner.

J. M. FORD, Assistant Examiner.

U.S. Cl. X.R.

117—33.3; 252—300

UNITED STATES PATENT OFFICE
CERTIFICATE OF CORRECTION

Patent No. 3,444,212          Dated January 26, 1970

Inventor(s) KENNETH ROBERT HUFFMAN and EDWIN FISHER ULLMAN

It is certified that error appears in the above-identified patent and that said Letters Patent are hereby corrected as shown below:

Column 2, line 55, under the reaction arrow please insert --NaH--.

Column 2, line 63, cancel the formula product designated II, and substitute therefore:

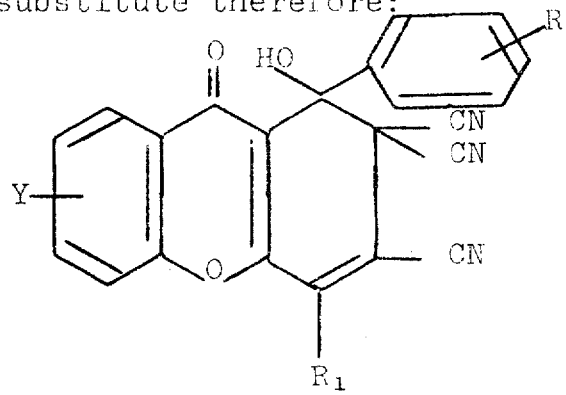

SIGNED AND SEALED
MAY 12 1970

(SEAL)
Attest:

Edward M. Fletcher, Jr.
Attesting Officer

WILLIAM E. SCHUYLER, JR.
Commissioner of Patents